United States Patent [19]

Mukasa et al.

[11] Patent Number: 4,603,091
[45] Date of Patent: Jul. 29, 1986

[54] RECORDING MEDIUM FOR PERPENDICULAR MAGNETIZATION

[75] Inventors: Koichi Mukasa, Koide; Takashi Hatanai; Keishi Nakashima, both of Nagaoka, all of Japan

[73] Assignee: Alps Electric Co., Ltd., Japan

[21] Appl. No.: 668,299

[22] Filed: Nov. 5, 1984

[30] Foreign Application Priority Data

Nov. 5, 1983 [JP] Japan ................. 58-206910

[51] Int. Cl.$^4$ .................. G11B 5/66; C22C 19/07
[52] U.S. Cl. .................. 428/611; 360/134; 428/662; 428/663; 428/660; 428/667; 428/668; 428/679; 428/928; 420/436
[58] Field of Search .............. 428/928, 660, 611, 662, 428/663, 667, 668, 679; 360/134; 420/436

[56] References Cited

U.S. PATENT DOCUMENTS 4,024,489  5/1977  Bajorek et al. .............. 428/660
4,079,169  3/1978  Nigh et al. .............. 428/928
4,124,737  11/1978  Wolfla .............. 420/436
4,410,603  10/1983  Yamamori et al. .............. 428/928
4,550,062  10/1985  Takayama et al. .............. 428/611

FOREIGN PATENT DOCUMENTS 3228403  3/1983  Fed. Rep. of Germany ...... 420/486

Primary Examiner—Veronica O'Keefe
Attorney, Agent, or Firm—Guy W. Shoup

[57] ABSTRACT

A magnetic recording medium for perpendicular magnetization includes a base of a nonmagnetic material, a first magnetic layer of a soft magnetic material on a surface of the base, a second magnetic layer having perpendicular anisotropy on a surface of the first magnetic layer, the second magnetic layer being magnetized in a transverse direction thereof. The second magnetic layer is composed of a three-element alloy of cobalt, chromium, and tantalum, cobalt being a main component with chromium and tantalum added thereto.

1 Claim, 3 Drawing Figures

RECORDING MEDIUM FOR PERPENDICULAR MAGNETIZATION

BACKGROUND OF THE INVENTION

The present invention relates to a magnetic recording medium, and more particularly to a magnetic recording medium capable of perpendicular magnetization recording.

Magnetic recording utilizing perpendicular magnetization has been studied in recent years for increasing the recording density of magnetic recording mediums. The magnetic recording medium used in this type of magnetic recording is composed of a base made of a nonmagnetic material, a first magnetic layer made of a soft magnetic material coated on a surface of the base, and a second magnetic layer having perpendicular anisotropy and coated on a surface of the first magnetic layer. Desired data can be recorded in a high density by magnetizing the second magnetic layer in a transverse direction thereof or a perpendicular direction.

FIG. 1 of the accompanying drawings shows in cross section such a magnetic medium for perpendicular magnetization and a recording head used for perpendicular magnetization. The base 1 is made of a nonmagnetic material such as synthetic resin such as polyester or polyimide or an aluminum sheet subjected to anodic oxidization. The first magnetic layer 2 of a soft magnetic material and the second magnetic layer 3 are successively formed on the surface of the base 1 to thereby construct the perpendicular-magnetization recording medium in the form of a tape or a disk.

The recording head is composed of a main magnetic pole 5 and an auxiliary magnetic pole 6 which are disposed one on each side of the magnetic recording medium. The main magnetic pole 5 has a thickness of about 1$\mu$ and is deposited as by sputtering on one surface of a support body 4 made of a nonmagnetic material such as glass or polyimide. A predetermined number of turns of an exciting coil 7 are wounded around the auxiliary magnetic pole 6. When the main magnetic pole 5 is excited from the auxiliary magnetic pole 6 by passing a signal current to be recorded through the exciting coil 7, a strong perpendicular magnetic field is generated in the vicinity of the tip end of the main magnetic pole 5 for magnetically recording the signal on the second magnetic layer 3 confronting the main magnetic pole 5.

It is known that the frequency characteristics particularly in the high frequency range can be improved by reducing the distance 1 between the first and second magnetic layers 2, 5 as small as possible. Therefore, the trend in the industry is toward a thinner configuration of the second magnetic layer 3.

With the conventional magnetic recording mediums, the first magnetic layer 2 is made of an alloy of iron and nickel or permalloy composed of such an alloy with copper and molybdenum added thereto, and the second magnetic layer 3 is made of an alloy of cobalt and chromium. Cobalt which is one of the constituents of the second magnetic layer 3 is of a hexagonal close-packed lattice (h, c, p) structure having a large crystallomagnetic anisotropy in the direction of the c-axis. By adding chromium to cobalt, the saturation magnetization of the layer is lowered to increase the ease with which the c-axis can be oriented perpendicularly to the surface of the layer. For this reason, the cobalt-chromium alloy is used as the material of the second magnetic layer 3.

However, the magnetic layer of cobalt-chromium alloy has a relatively small, about 0.6, ratio Br ($\perp$)/Br ($\parallel$) of a perpendicular residual magnetic flux density Br ($\perp$) to a horizontal residual magnetic flux density Br ($\parallel$) (in the plane of the layer), the ratio being hereinafter referred to as a "perpendicular residual magnetic flux density ratio"), and an anisotropic magnetic intensity Hk of about 2400 Oe, magnetic characteristics which are not sufficiently satisfactory. The above tendency manifests itself where the film thickness of the magnetic layer is 0.3 $\mu$m or smaller.

To improve the magnetic characteristics, it has been proposed to add a third element such as tungsten (W), molybdenum (Mo), or a rhenium (Re) to the cobalt-chromium alloy. However, the third element fails to be sufficiently effective, and particularly cannot increase the perpendicular residual magnetic flux density ratio above 1.

SUMMARY OF THE INVENTION

It is an object of the present invention to provide a magnetic recording medium for perpendicular magnetization which has excellent magnetic characteristics.

According to the present invention, a magnetic recording medium for perpendicular magnetization includes a base of a nonmagnetic material, a first magnetic layer of a soft magnetic material on a surface of the base, a second magnetic layer having perpendicular anisotropy on a surface of the first magnetic layer, the second magnetic layer being magnetized in a transverse direction thereof. The second magnetic layer is composed of a three-element alloy of cobalt, chromium, and tantalum, cobalt being a main component with chromium and tantalum added thereto.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

The inventors have studied various constituent materials for a magnetic layer having perpendicular anisotropy, and, as a result, found that the magnetic layer made of a three-element alloy of cobalt, chromium, and tantalum has a perpendicular residual magnetic flux density ratio of 1 or more, an increased anisotropic magnetic intensity, and excellent magnetic characteristics.

A base is made of crystalline glass, and pellets of chromium and tantalum are placed on a cobalt disk radially from the center. The alloy composition is varied by adjusting the number of pellets on the target. After a high vacuum has been created, an argon gas is introduced, and sputtering is effected with high-frequency electric power to form on the base a thin film of a three-element amorphous alloy of Co—Cr—Ta with cobalt being a main component. Alloy samples of various compositions thus prepared are used in various characteristics tests described later on.

Figure 1:
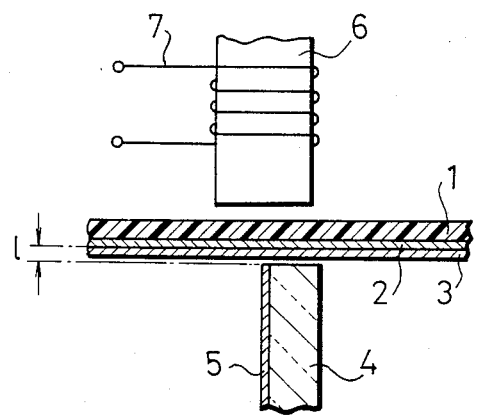
FIG. 1 is a cross-sectional view of a magnetic recording medium for perpendicular magnetization and a magnetic recording head for perpendicular magnetization.
Figure 2:
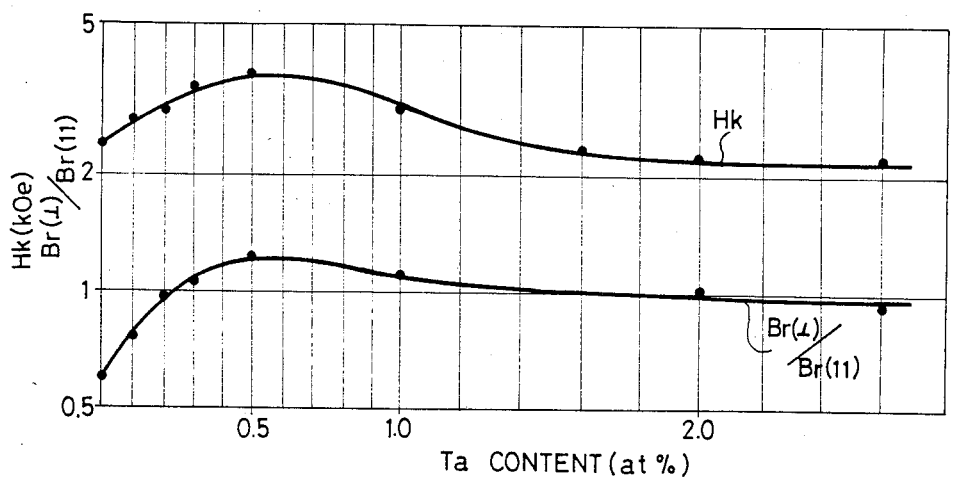
FIGS. 2 and 3 are diagrams showing magnetic characteristics.

FIG. 2 is illustrative of magnetic characteristics of alloys [($Co_{77.9}$ $Cr_{22.1}$)100−x $Ta_x$] having constant cobalt content of 77.9 atomic %, a constant chromium content of 22.1 atomic %, and different tantalum contents x(atomic %).

It is clear that the perpendicular residual magnetic flux density ratio becomes quite higher by the addition of a small quantity of tantalum as compared with a two-element alloy of cobalt and chromium with tantalum content 0 atomic %, the perpendicular residual magnetic flux density ratio being at maximum where the tantalum content is about 0.5 atomic %. As the tantalum content is increased beyond that range, the perpendicular residual magnetic flux density ratio is gradually reduced. However, the perpendicular residual magnetic flux density ratio of that which contains 2.6 atomic % of tantalum is in the vicinity of 1, which is higher than that of an alloy with no tantalum content.

The anisotropic magnetic intensity Hk is also increased by the addition of a small quantity of tantalum, and is at maximum where the tantalum content ranges from about 0.5 to 0.7 atomic %. As the tantalum content is increased beyond that range, Hk is gradually reduced. However, where the tantalum content is about 1.2 atomic % or below, Hk is higher than that of an alloy with no tantalum content. Such a tendency remains the same even if the ratio of the other components, cobalt and chromium, is more or less varied, as illustrated in FIG. 3 which will be described later on.

Therefore, the tantalum content in alloys should be kept in the range of about 0.1 to 1.2 atomic % to exhibit its effect of being added and gain a high perpendicular residual magnetic flux density ratio and anisotropic magnetic intensity. Since a perpendicular saturation magnetic flux density Bs (⊥) and coersive force Hc (⊥) tend to be lowered with the addition of tantalum, the tantalum content should more preferably be in the range of about 0.1 to 0.7 atomic %.

Figure 3:
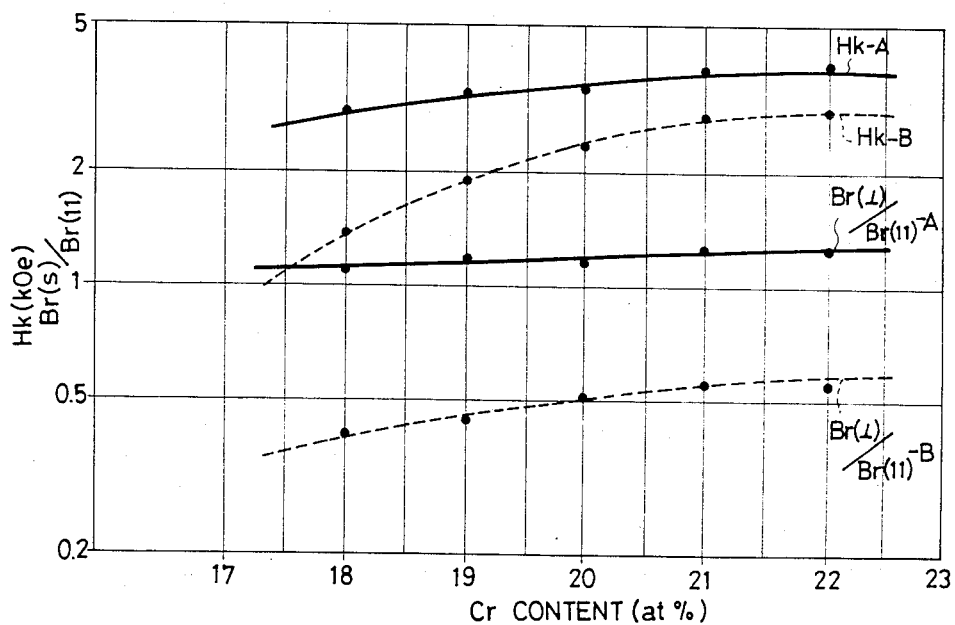

FIG. 3 is illustrative of magnetic characteristics of a three-element alloy (solid lines) of Co—Cr—Ta according to the present invention, and a conventional two-element alloy (dotted lines) of Co—Cr. These alloys with the illustrated magnetic characteristics include 100 atomic % of a Co—Cr alloy component with various Cr contents. The tantalum content in the alloys of the invention is 0.5 atomic %. Designated at Hk - A and Hk - B are anisotropic magnetic intensities of the alloys of the invention and the prior art, respectively, and Br (⊥)/Br (∥)−A and Br (⊥)/ Br(∥)−B perpendicular residual magnetic flux density ratios of the alloys of the invention and the prior art, respectively.

FIG. 3 clearly shows that the effect of tantalum added for the anisotropic magnetic intensity and the perpendicular residual magnetic flux density ratio remains the same even if the chromium content is more or less varied. While in the prior alloy the anisotropic magnetic intensity and the perpendicular residual magnetic flux density ratio are extremely lowered as the chromium content is reduced, the present invention is improved in that the anisotropic magnetic intensity and the perpendicular residual magnetic flux density ratio are kept at high levels at all times.

The following table shows the effect of third elements Y added to the Co—Cr alloy, the composition ratio (atomic %) being ($Co_{77.9}$ $Cr_{22.1}$)99.5 $Y_{0.5}$. The thickness of each magnetic layer formed by sputtering is 0.3 μm. The table shows that those alloys with Ti, Zr, Nb, Mo and W added as the third element have a perpendicular residual magnetic flux density ratio of smaller than 1 and a low anisotropic magnetic intensity, but the alloy with Ta added as the third element has a perpendicular residual magnetic flux density ratio of 1.24 and a high anisotropic magnetic intensity of 3700 Oe.

TABLE

| 3rd element | Bs(⊥)KG | Hc(⊥)Oe | Br(⊥/Br(//) | Hk Oe |
|---|---|---|---|---|
| None | 6.76 | 870 | 0.59 | 2400 |
| Ta | 5.78 | 990 | 1.24 | 3700 |
| Ti | 4.35 | 600 | 0.51 | 1800 |
| Zr | 3.71 | 630 | 0.67 | 980 |
| Nb | 3.32 | 900 | 0.71 | 2500 |
| Mo | 4.97 | 800 | 0.74 | 2200 |
| W | 5.90 | 1150 | 0.99 | 3700 |

Although a certain preferred embodiment has been shown and described, it should be understood that many changes and modifications may be made therein without departing from the scope of the appended claims.

What is claimed is:

1. A magnetic recording medium for perpendicular magnetization, consisting essentially of:
   (a) a base of a nonmagnetic material;
   (b) a first magnetic layer of a soft magnetic material on a surface of said base;
   (c) a second magnetic layer having perpendicular anisotropy on a surface of said first magnetic layer, said second magnetic layer being magnetized in a transverse direction thereof; and
   (d) said second magnetic layer consisting of a three-element alloy of cobalt, chromium, and tantalum, with the range of atomic % of cobalt 75–82, chromium 18–25, and tantalum 0.1–1.1.

* * * * *